United States Patent
Ruckle et al.

[15] 3,650,034
[45] Mar. 21, 1972

[54] METHOD AND APPARATUS FOR OPTICAL ALIGNMENT

[72] Inventors: Robert A. Ruckle; George E. Shepard, both of Ponca City, Okla.

[73] Assignee: Continental Oil Company, Ponca City, Okla.

[22] Filed: May 29, 1969

[21] Appl. No.: 828,911

[52] U.S. Cl.................................33/46 R, 33/74 D, 356/153
[51] Int. Cl.......................................................G01c 15/12
[58] Field of Search....................33/70 C, 70 D, 84, 46.2, 88, 33/74 A, 46 A, DIG. 1, 60; 356/138, 153, 139

[56] References Cited

UNITED STATES PATENTS

| | | | |
|---|---|---|---|
| 1,295,842 | 3/1919 | Berger | 350/114 |
| 1,476,077 | 12/1923 | Hart | 33/46 AT |
| 2,570,275 | 10/1951 | Reading | 33/46 AT |
| 2,618,194 | 11/1952 | Kawabata | 350/113 X |
| 3,072,010 | 1/1963 | Brill | 356/138 |
| 2,914,855 | 12/1959 | Daum | 33/74 D |
| 3,355,810 | 12/1967 | Franklin | 33/DIG. 1 |
| 3,374,545 | 3/1968 | Monroe | 33/74 B |

FOREIGN PATENTS OR APPLICATIONS 1,501  1877  Great Britain..........................33/74 B

*Primary Examiner*—William D. Martin, Jr.
*Attorney*—Joseph C. Kotarski, Henry H. Huth, Jerry B. Peterson, William J. Miller and David H. Hill

[57] ABSTRACT

A method and apparatus for establishing a line of measurement normal to an optical line of sight, the apparatus including a linear scale and a viewing box adjustably connected to the scale. The viewing box has two sides which diverge from each other in extending outwardly from a planar surface of the linear scale which carries measuring indicia. These sides each carry a series of parallel lines. In the method of the invention, an optical line of sight is established by the use of bench marks and a sighting instrument having a sighting crosshair. One end of the linear scale is then placed against a reference point on structure to be optically aligned, and the viewing box is moved along the scale until the line of sight passes through the viewing box. The scale and box are then pivoted about the reference point in a precise level plane until the parallel lines of the viewing box extend parallel to the crosshair. In this status, the linear scale extends at a right angle to the line of sight.

3 Claims, 7 Drawing Figures

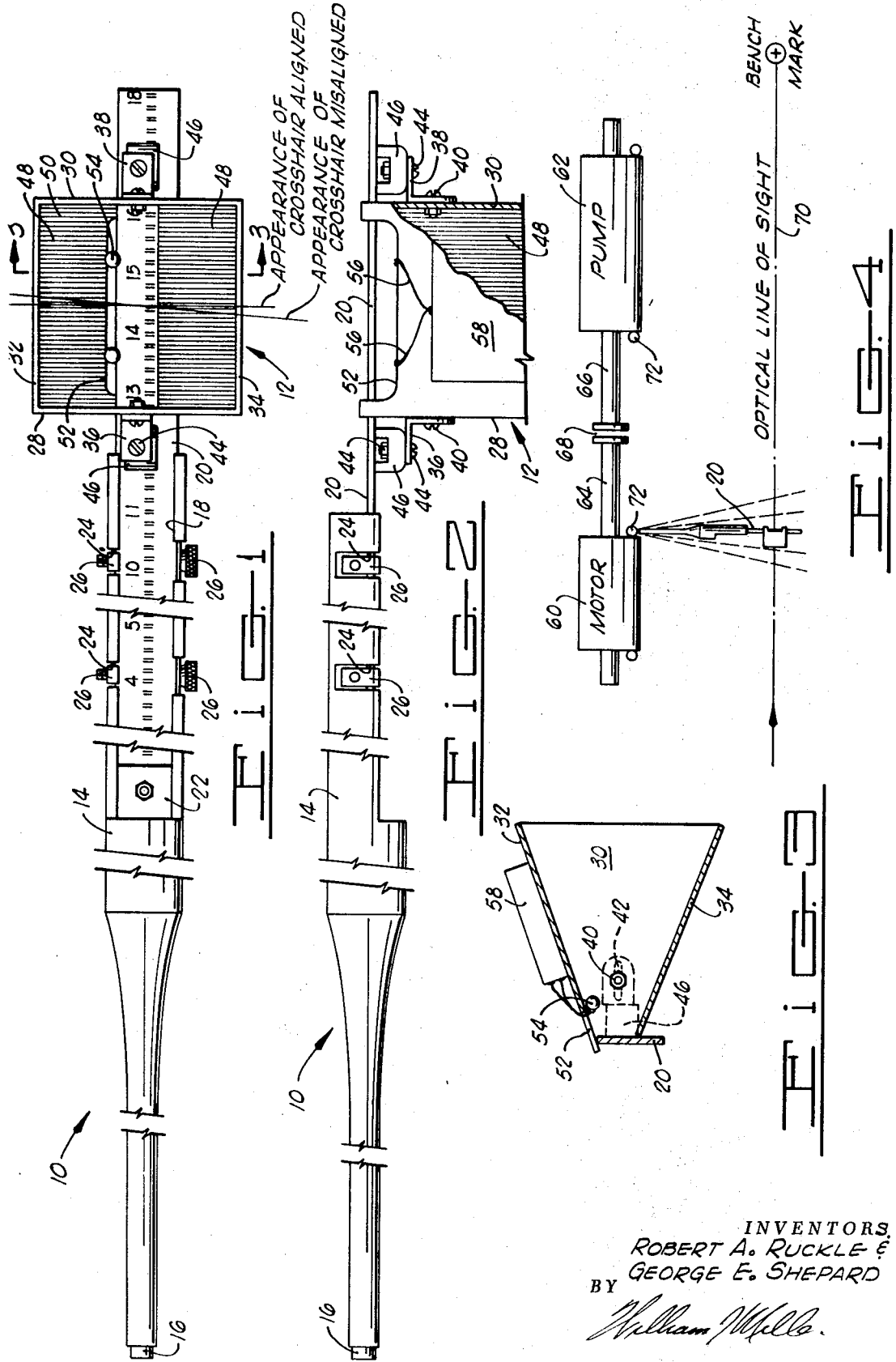

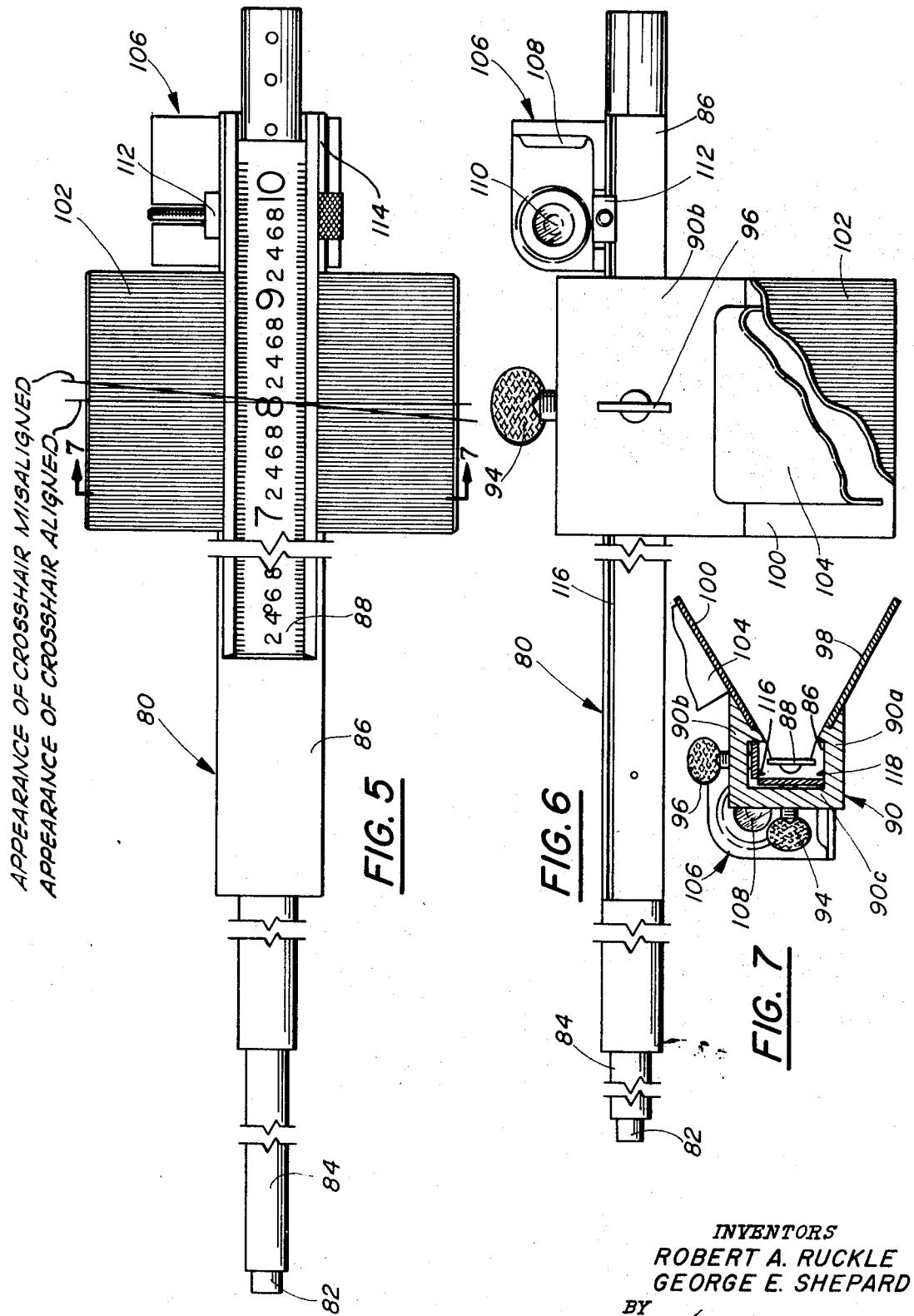

METHOD AND APPARATUS FOR OPTICAL ALIGNMENT

BACKGROUND OF THE INVENTION

1. Field of the Invention

This invention relates to methods and apparatus for optically aligning machinery, and more particularly, to a method and apparatus for establishing a line of measurement extending normal to a line of sight.

2. Brief Description of the Prior Art

In aligning industrial machinery, it has been the practice to establish an optical line of sight and then to measure along lines extending from tooling ball reference points on the machinery normal to the line of sight. A linear optical scale device is positioned with one of its ends against the tooling ball, and the scale is then "rocked in" in a precise level plane to establish the linear distance between the line of sight and tooling ball along a line extending normal to the line of sight. In "rocking in" the optical scale, the leveled scale is repeatedly pivoted or rocked in the plane containing the line of sight about its end contacting the tooling ball. A person looking along the line of sight through a sighting instrument having crosshairs then locates the minimum reading on the scale during its rocking movement, and this establishes the position of the scale at which it extends in a precise level plane at a right angle to the line of sight. The described "rocking in" method of optical alignment is time consuming, and is subject to individual error.

BRIEF DESCRIPTION OF THE INVENTION

The optical alignment method and apparatus of this invention permit the normalizing of the line of measurement with respect to the optical line of sight to be accomplished quickly and accurately. Broadly described, the apparatus of the invention comprises a rigid, linear optical scale device and a parallel line-viewing box adjustably mounted on the scale device and surrounding the measuring indicia which are being viewed on the scale device. The viewing box has at least one wall which has a plurality of parallel lines thereon which are spaced from each other along the line of measurement along the optical scale, and at a right angle to the viewing surface of the scale.

In the method of the invention, an optical line of sight is established adjacent a piece of machinery or equipment which is to be subjected to alignment measurements or to measurements of movement of particular points on the machinery as compared to previous measurements. The optical scale device is then positioned in a precise level with one end against a reference point, such as a tooling ball, on the machinery, and with the scale intersecting the optical line of sight. The viewing box is then secured to the optical scale device so that the parallel lines thereof extend normal to the longitudinal axis (line of measurement) of the optical scale device, and so that the crosshair of the sighting instrument is located in the parallel lines. The scale device is then pivoted or rocked in a horizontal plane only enough to bring the parallel lines of the viewing box into parallelism with the vertical crosshair of the transit or other instrument used to sight in the optical line of sight.

In a preferred embodiment of the invention, the viewing box includes a pair of diverging sides each carrying parallel lines extending substantially normal to the longitudinal axis of the optical scale device, and each secured to a channel slidably mountable on the optical scale device. Retaining means is provided in association with the channel to retain the channel and diverging sides secured thereto at a fixed location on the optical scale device.

From the foregoing summary description of the invention, it will have become apparent that it is an important object of the invention to provide an improved, more accurate method of extending lines of measurement normal to an optical line of sight.

An additional object of the invention is to improve the apparatus used for optically aligning industrial machinery and equipment.

A further object of the invention is to provide an apparatus for quickly and easily determining an angle of 90° with respect to an optical line of sight.

Another object of the invention is to provide an apparatus and method of using it by which a rigid linear measuring device may be more accurately extended at a right angle to an optical line of sight.

Other objects and advantages of the invention will become apparent as the following detailed description of the invention is read in conjunction with the accompanying drawings which illustrate the invention.

BRIEF DESCRIPTION OF THE DRAWINGS

FIG. 1 is a view in elevation of one embodiment of the optical alignment apparatus of the invention.

FIG. 2 is a plan view of the apparatus illustrated in FIG. 1.

FIG. 3 is a sectional view taken along line 3—3 of FIG. 1.

FIG. 4 is a diagrammatic illustration of the practice of the method of the invention.

FIG. 5 is a view in elevation of another embodiment of the invention.

FIG. 6 is a plan view of the apparatus illustrated in FIG. 5.

FIG. 7 is an enlarged sectional view taken along line 7—7 of FIG. 5.

DETAILED DESCRIPTION OF PREFERRED EMBODIMENTS OF THE INVENTION

As illustrated in FIG. 1 of the drawing, the apparatus of the invention includes an optical scale device 10, and a viewing box 12 which is adjustably and detachably mounted on the optical scale device. The optical scale device 10 may be any suitable rigid linear measuring instrument which permits a high level of accuracy to be realized in measuring the linear distance between two points. In the embodiment of the invention illustrated in FIG. 1, however, the linear scale device 10 is a device of the type depicted and described in U.S. Pat. application Ser. No. 702,478, filed Feb. 1, 1968, and assigned to the assignee of the present invention. An optical scale device of this type includes an elongated rod 14 which is tapered to a relatively small transverse dimension at one of its ends, and which is made of a material which has a low coefficient of thermal expansion. The small end of the rod 14 is bored to receive a metal contactor 16 having a concavity in one end configured to mate with the spherical head of a metal tooling ball. An elongated slot 18 is extended along the rod from its end opposite the end carrying the metal contactor 16 and functions to receive at least a portion of a graduated optical alignment scale 20. This scale 20 is preferably made of a ferrous metal, for reasons hereinafter described, and abuts a metal stop plate 22 which is permanently secured at the inner end of the slot 18 and acts as a positive stop for the scale.

At one or more locations along the portion of the rod traversed by the scale-receiving slot 18, transverse notches 24 are formed in the rod and accommodate screw operated clamps 26 which function to lock the scale 20 in precisely the same position each time it is inserted in the slot and abuts the metal stop plate 22.

One form of the viewing box 12 forming a portion of the optical alignment apparatus of the present invention includes a pair of substantially parallel, trapezoidally shaped side walls 28 and 30 which extend between, and are each secured at the edges to, a pair of divergent walls 32 and 34 (see FIGS. 1 and 3). Secured to the outside of the parallel side walls 28 and 30 are a pair of substantially L-shaped brackets 36 and 38. The toe portion of each of the L-shaped brackets 36 and 38 extends substantially normal to the respective side wall 28 or 30 to which each bracket is secured, and each of the brackets is secured to its respective side wall by means of a suitable screw 40 which is extended through a slot 42 formed in that portion of the bracket which flatly abuts the respective side wall. Each of the brackets 36 and 38 may thus be adjusted in its position on its respective side wall so as to move it nearer to, or farther from, the convergent ends of the walls 32 and 34.

The outwardly extending toe portions of each of the brackets 36 and 38 are secured by suitable screws 44 to small magnets 46 which permit the viewing box 12 to be magnetically secured to the metal optical scale 20. As will be further discussed hereinafter, the brackets 36 and 38 can be adjusted in their positions on the side walls 28 and 30 to assure that the viewing box 12 occupies the desired position in relation to the indicia of measurement carried by the graduated optical scale 20.

As will be perceived in referring to FIG. 1, the inside surface of each of the divergent walls 32 and 34 carries a plurality of fine parallel lines 48 which extend over substantially the entire width of each of the respective walls on which they are located. The fine parallel lines 48 carried by the wall 32 are preferably parallel to the lines 48 on the inside surface of the wall 34, and are preferably aligned therewith. Also, in a preferred embodiment of the invention, the lines are spaced about 0.025 inch from each other.

The wall 32 has a slot or relief 52 formed in its longitudinal edge which is nearest adjacent the convergent wall 34. The wall 32 is slightly longer than the wall 34 so that when the viewing box 12 is mounted on the optical scale device 10 in the manner illustrated, the edge portion of the wall 32 projects beyond the edge of the scale device in the manner depicted in FIG. 3. The provision of the slot 52 enables a pair of light bulbs 54 or other illuminating devices to be positioned inside the viewing box 12 at the edge of the wall 32 and electrical leads 56 to be extended from these bulbs to a battery 58 or other suitable source of electrical current which can conveniently be secured to the outside of the wall 32.

The depicted and described apparatus can be utilized in the method of the invention for the purpose of effecting the optical alignment of various types of associated, but individually movable, parts of mechanical equipment. Thus, industrial machinery which includes several devices, such as pumps and compressors, connected in a kinematic chain frequently must be accurately aligned in order to prevent damage to interconnecting shafting, or to the various devices themselves. Misalignment may tend to occur when the machinery becomes heated during use, or for other reasons. Checks on the alignment of such industrial equipment, both in the cold inoperative status, as well as in the hot operating status, can be quickly and accurately made by use of the method and apparatus of the present invention.

One method of accomplishing such optical alignment is diagrammatically illustrated in FIG. 4 of the drawings. In referring to this figure and to the apparatus hereinbefore described, there is shown in FIG. 4, a motor 60 which is typically secured to the floor of an industrial plant, and which is drivingly connected to a pump 62 through interconnecting shafting. A shaft 64 may thus extend from the motor and a shaft 66 from the pump, a coupling 68 being provided between the shafts. It is desirable when operating equipment of this type over extended periods of time to periodically check the alignment of the pump 62 and motor 60 to assure that malfunctioning or damage does not occur as a result of vibration and induced misalignment.

In preparing to practice the method of the invention for optically checking the alignment of the motor 60 and pump 62 and of the interconnecting shafting, an optical line of sight 70 is initially established adjacent the equipment and horizontally spaced therefrom by a relatively short distance. Initially a clear line of sight must be established as close, and as nearly parallel, to the center line of the shaft as possible. The line of sight must be located such that the transit used for its establishment has a stable base. To establish the original line of sight, permanent bench marks are set in the structure which houses the motor 60 and pump 62. Once the transit instrument is set up and in position and the line of sight 70 established, readings may be taken. The optical line of sight 70 constitutes a base or reference line from which measurements are taken to various points on the equipment. The measurements are taken preferably at a time when the equipment is in a non-operating (cold) condition, and are then later repeated when the equipment is running in a normal operating (hot) condition. The two sets of readings (cold versus hot) may then be compared and the distances plotted graphically to illustrate relative movement of the machinery which occurs between operating and non-operating conditions.

For the purpose of establishing convenient and usable reference points on the machinery and equipment, tooling balls 72 having spherical heads are secured to the machinery by drilling holes thereinto and cementing the tooling balls in place with epoxy glue or other suitable adhesive. When possible, these tooling balls 72 are mounted in the lower half of the bearing housing of the motor, pump or other equipment and are located as near as possible to the center line of the shafting which interconnects the machinery.

With the optical line of sight established and the tooling balls 72 in place, the apparatus of the present invention is then brought into use. First, the concavity in the end of the metal contactor 16 is placed on a tooling ball 72 and the optical scale device 10 is extended outwardly from the tooling ball to traverse the optical line of sight. THe optical line of sight will have been established at some distance from the machinery such that it will intersect the graduated portion of the optical scale 20. Thus, the graduations on the scale 20 will be visible through the transit when sighting along the optical line of sight.

Prior to placing the tip of the optical scale device 10 against a tooling ball 72, the viewing box 12 has been adjusted in its position on the metallic scale 20 so that the fine parallel lines 48 on the inside surface of the diverging walls 32 and 34 extend normal to the longitudinal axis of the scale 20, or, stated differently, extend parallel to the indicia lines of graduation on this scale. Adjustment of the position of the viewing box 12 on the scale 20 to attain this relationship between the fine parallel lines 48 and the scale indicia can be realized by adjusting the brackets 36 and 38 in their positions on the parallel side walls 28 and 30 of the viewing box.

When the viewing box 12 has been aligned in the manner described, and is positioned on the optical scale device 10 at a position along the scale 20 such that the vertical crosshair of the transit appears to be in about the center of the viewing box as shown in FIG. 1, the perpendicularity of the optical scale device 10 with respect to the optical line of sight is next established. Such perpendicularity may be determined by observing when the vertical crosshair of the transit is aligned (coincident) with, or extends parallel to, the fine parallel lines 48 on the inside surfaces of the walls 32 and 34 and the optical scale is in a precise level plane. If such alignment or parallelism does not exist, but rather the vertical crosshair of the transit crosses or extends at an angle to the parallel lines of the walls 32 and 34, this is indicative of a departure of the optical scale device 10 from strict perpendicularity with respect to the optical line of sight. By slightly rocking or pivoting the optical scale device 10 on the tooling ball 72 in a precise level plane, such angularity of the optical scale device can be eliminated and the device made to extend perfectly perpendicular to the optical line of sight. We have found that when the crosshair of the transit does not appear to cross any of the perpendicular lines on the walls 32 and 34, a measurement from the optical line of sight to the reference point represented by the tooling ball 72 on the machinery can be taken with a very high degree of accuracy.

Measurements from the optical line of sight to tooling ball reference points on the machinery are repeated using the several different tooling balls 72 spaced along the kinematic chain. As has been previously indicated, a set of readings is preferably obtained in the inoperative or cold status of the machinery, and another set obtained when the machinery is in its operating and heated condition. The two sets of readings can then be compared and the differences plotted graphically to evaluate the extent to which the machinery has become misaligned or moved as a result of differing stresses and conditions obtaining at the times of operation as compared to the times when the equipment is shut down.

A different and preferred embodiment of the invention is depicted in FIGS. 5, 6 and 7. Here a linear optical scale device 80 is depicted which differs in several respects from that depicted in FIGS. 1-4. Thus, the scale includes a steel contacter 82 which is detachably pinned in a cylindrical bore in an Invar mounting rod 84. Invar is a nickel alloy having a very low coefficient of thermal expansion manufactured by the Carpenter Steel Company of Reading, Pennsylvania. The Invar mounting rod 84 is detachably pinned in an aluminum scale holder rod 86. The scale holder rod 86 is of a cross-sectional configuration showed in FIG. 7 and detachably retains an elongated optical scale 88 which is graduated in tenths of an inch and which is attached to the Invar mounting rod. The linear optical scale device 80 is described in greater detail in U.S. application Ser. No. 836,503, filed June 25, 1969, and assigned to the assignee of the present invention. Slidingly mounted on the aluminum rod 86 is a generally C-shaped channel member 90. The channel member 90 has legs 90a and 90b, and a bight portion 90c which define a channel in which the optical scale device 80 is slidingly located. A suitable retaining means is provided in association with the channel member 90 to retain the channel member secured at a selected location on the optical scale device 80. In the illustrated embodiment of the invention, the retaining means is a pair of set screws 94 and 96 which extend at right angles to each other through the bight portion 90c, and one leg 90a, respectively, of the channel member 90 so as to bear against the optical scale device 80 when the set screws are set, and thus prevent sliding movement of the channel member on the optical scale device.

It will be noted in referring to FIG. 7 that the legs 90a and 90b of the channel member 90 have tapered or inclined surfaces at the free ends thereof, and that a pair of diverging plates 98 and 100 are secured to these surfaces and face each other. The plates 98 and 100 have parallel lines 102 inscribed or formed thereon in the manner hereinbefore described and for the purpose of bringing the axis of the scale 88 into perpendicularity with the line of sight. A battery retaining box 104 is secured to the outer surface of one of the plates 100 for the purpose of containing one or more batteries to supply current to light bulbs (not shown) suitably located to illuminate the parallel lines.

There is also provided on the optical alignment scale device 80, a compound spirit level device 106 which carries a pair of spirit level bubbles 108 and 110 lying in planes extending at right angles to each other. The compound spirit level device 106 is attached to the scale device 80 by means of protuberant flanges 112 and 114 which engage grooves 116 and 118 formed in the sides of the aluminum scale holder rod 86.

The embodiment of the invention depicted in FIGS. 5, 6 and 7 is used in substantially the same manner as the embodiment which is illustrated in FIGS. 1-4. In some uses, however, it is desirable that the scale 88 be positioned in a vertical plane, and that the axis of this scale extend precisely vertically. In these orientations, just as in the precision leveling of scale 88 when horizontal measurements are to be obtained, the compound spirit level permits the scale to be positioned in the desired status.

Although certain preferred embodiments of the invention have been herein described in order to provide an illustration of the manner in which the invention is to be practiced, it will be understood that various changes and innovations in the described method and apparatus can be effected without departure from the basic principles which underlie the invention. All changes and modifications of this type which do not depart from the basic principles of the invention are therefore deemed to be circumscribed by the spirit and scope of the invention.

What is claimed is:

1. Apparatus for optical measurements comprising a rigid linear optical scale device having graduated indicia thereon, a rigid viewing box connected to said scale device, said viewing box having two diverging walls extending outwardly from said optical scale device, both of said walls having a plurality of parallel lines extending normal to the linear axis of said graduated indicia, side panels enclosing said divergent walls to form a boxed enclosure, brackets adjustably secured to each side of said walls adjacent said scale device and projecting from said viewing box, and means carried by said brackets for detachably connecting said viewing box to said scale device.

2. Apparatus as defined in claim 1 wherein said viewing box is further characterized in including means for artificially illuminating said parallel lines.

3. Apparatus as defined in claim 1 wherein one of said diverging walls is slotted along an edge adjacent said scale device, and said viewing box further comprises:
- a source of electrical power mounted on said one of said diverging walls;
- a light bulb mounted between said diverging walls for illuminating said parallel lines; and
- electrical leads extending from said bulb to said source of electrical power through the slot in said one wall.

* * * * *